United States Patent
Shinjo

(10) Patent No.: US 6,980,402 B2
(45) Date of Patent: Dec. 27, 2005

(54) MAGNETIC HEAD

(75) Inventor: Yasuhiko Shinjo, Atsugi (JP)

(73) Assignee: Mitsumi Electric Co., Ltd., Tama (JP)

( * ) Notice: Subject to any disclaimer, the term of this patent is extended or adjusted under 35 U.S.C. 154(b) by 43 days.

(21) Appl. No.: 10/284,081

(22) Filed: Oct. 30, 2002

(65) Prior Publication Data
US 2003/0179506 A1    Sep. 25, 2003

(30) Foreign Application Priority Data
Mar. 20, 2002 (JP) .............................. 2002-077506

(51) Int. Cl.$^7$ .......................... G11B 5/127; G11B 5/39
(52) U.S. Cl. ........................................... 360/319
(58) Field of Search ........................ 360/319, 313, 360/323, 110

(56) References Cited

U.S. PATENT DOCUMENTS

| | | | |
|---|---|---|---|
| 6,177,207 B1 * | 1/2001 | Koike | 428/692 |
| 2003/0147184 A1 * | 8/2003 | Lee et al. | 360/319 |

OTHER PUBLICATIONS

"High Resistivity, High Permeability Shield Spacers for Magnetoresistive Head", IBM TDM, Dec. 2000, No. 440, pp. 2191.*

S. Ohnuma, (*The Research Institute of Electric and Magnetic Materials, Sendai*), H. Fujimori (*Institute for Materials Research, Tohoku University, Sendai*); Magnetic Properties of Granular Co based films (p. 7-13,) Jun. 14, 1995?.

* cited by examiner

*Primary Examiner*—Julie Anne Watko
(74) *Attorney, Agent, or Firm*—Darby & Darby

(57) ABSTRACT

The object of the present invention is to provide a magnetoresistive magnetic head having good, stable playback characteristics. In an MR head wherein an MR element is interposed between a lower shield layer and an upper shield layer, separated by non-magnetic layers. The lower shield layer and the upper shield layer are formed from a material having high permeability and high resistivity. Since the magnetic shield layers are formed from materials having high permeability and high resistivity, even if friction causes dragging of the head surface, there is effectively no short circuit between the magnetic shield layer and the magnetic element.

1 Claim, 2 Drawing Sheets

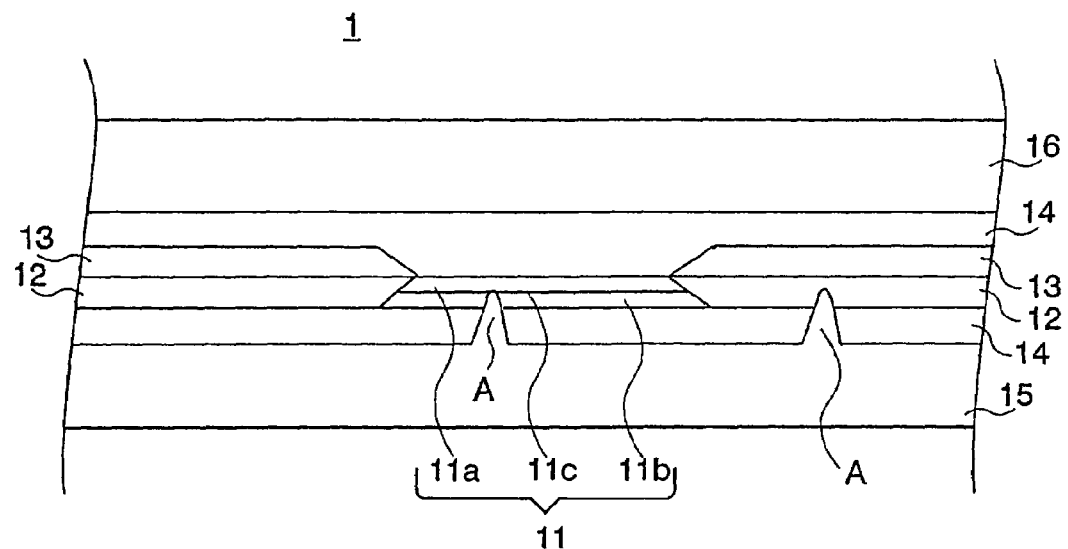
Figure 1
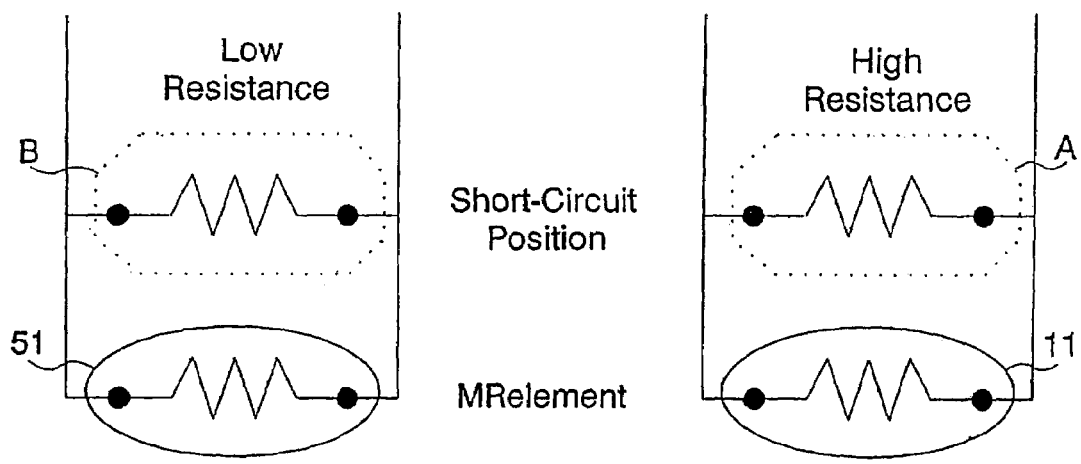
Figure 2A Figure 2B
PRIOR ART

MAGNETIC HEAD

FIELD OF THE INVENTION

The present invention relates to magnetic heads. More specifically, the present invention relates to magnetoresistive magnetic heads having a magnetoresistive element which serves as a magnetism sensing element.

BACKGROUND OF THE INVENTION

Magnetoresistive heads equipped with a magnetoresistive element (MR element) which acts as a magnetism sensing element have been used in dedicated playback heads that detect magnetic signals recorded on a magnetic recording medium such as a magnetic tape or a magnetic disk. An MR element is formed as a magnetoresistive film. Biasing layers, electrode layers, or the like are disposed at the edges of a side of the film. The electrical resistance of the magnetoresistive film changes in response to external magnetic fields.

The magnetoresistive head (hereinafter referred to as an MR head) is placed where a signal magnetic field from a magnetic recording medium is applied. A sensing current is supplied to the MR element, and potential changes in the MR element are detected. As a result, the magnetic signals recorded on the magnetic recording medium can be detected.

FIG. 4 illustrates a conventional magnetoresistive head 50. FIG. 4 is a detail drawing of the MR head 50 as seen from the plane facing the magnetic recording medium (the facing plane). A longitudinal bias layer 52 and an electrode layer 53 are disposed on either side of a centrally positioned MR element 51. Non-magnetic layers 54, a lower shield layer 55, and an upper shield layer 56 are disposed on either side of this structure.

As shown in FIG. 4, the MR element 51 includes a magnetoresistive film 51a (hereinafter referred to as MR film 51a), a transverse bias film 51b which applies a transverse bias magnetic field to the MR film 51a, and a magnetic separation film 51c which magnetically separates the MR film 51a and the transverse bias film 51b. These elements are formed at a predetermined width (track width) on the plane facing the magnetic recording medium. The pair of longitudinal bias films 52 at the ends of the MR element 51 apply a longitudinally biased magnetic field to the MR element 51.

In this MR head 50, the distance between the lower shield layer 55 and the upper shield layer 56 is the playback gap length. This playback gap length is a factor in determining the smallest magnetic signal that can be played back and, therefore, plays a significant role in playback characteristics.

The MR head 50 described above has been installed in hard drives as "flying heads" that do not make sliding contact with the magnetic recording medium during recording and playback. However, in recent years, MR heads are also being installed in tape-based recording/playback devices such as tape streamer devices.

In a tape streamer, the magnetic recording medium, in the form of a magnetic tape, slides at high speeds against the side of the MR head that faces the magnetic tape. This results in friction which can lead to problems. More specifically, if the MR head 50 slides against a magnetic tape, the metallic films forming the shield layers 55, 56, the longitudinal bias layer 52, and the electrode layer 53 wears or is dragged or moved. This can cause electrical or magnetic shorts in the elements making up the MR head 50. An electrical short circuit between the shield layers 55, 56 and the MR element 51 can cause the sensing current to become unstable, thereby deteriorating the quality of playback output. Such a sort circuit also prevents the biasing layer from applying an appropriate bias magnetic field to the MR film 51a.

OBJECT AND SUMMARY OF THE INVENTION

The object of the present invention is to provide a magnetoresistive magnetic head having good, stable playback characteristics.

In order to achieve these objectives, the present invention provides a magnetic head wherein a magnetoresistive element extending outward on a predetermined track width at a surface facing a magnetic recording medium is interposed between a pair of magnetic shield layers, separated by non-magnetic layers. The magnetic shield layers are formed from a material having high permeability and high resistivity. Preferably, the magnetic shield layers have a permeability of at least 300 and a resistivity of at least 1000 microohm/cm. The magnetic shield layers can be comprised of a granular alloy.

With this type of magnetic head, even if the head surface is worn, dragged, or moved due to friction, the high permeability, high resistivity material in the magnetic shield layers effectively prevent short-circuits between the magnetic shield layers and the magnetic element.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a drawing of an MR head according to an embodiment of the present invention, as seen from the side that faces the magnetic tape.

FIGS. 2(a) and (b) are circuit diagrams illustrating the differences in short circuits generated by (b) an MR head having a high resistance and (a) conventional or low resistance MR heads.

DETAILED DESCRIPTION OF THE INVENTION

Figure 3:
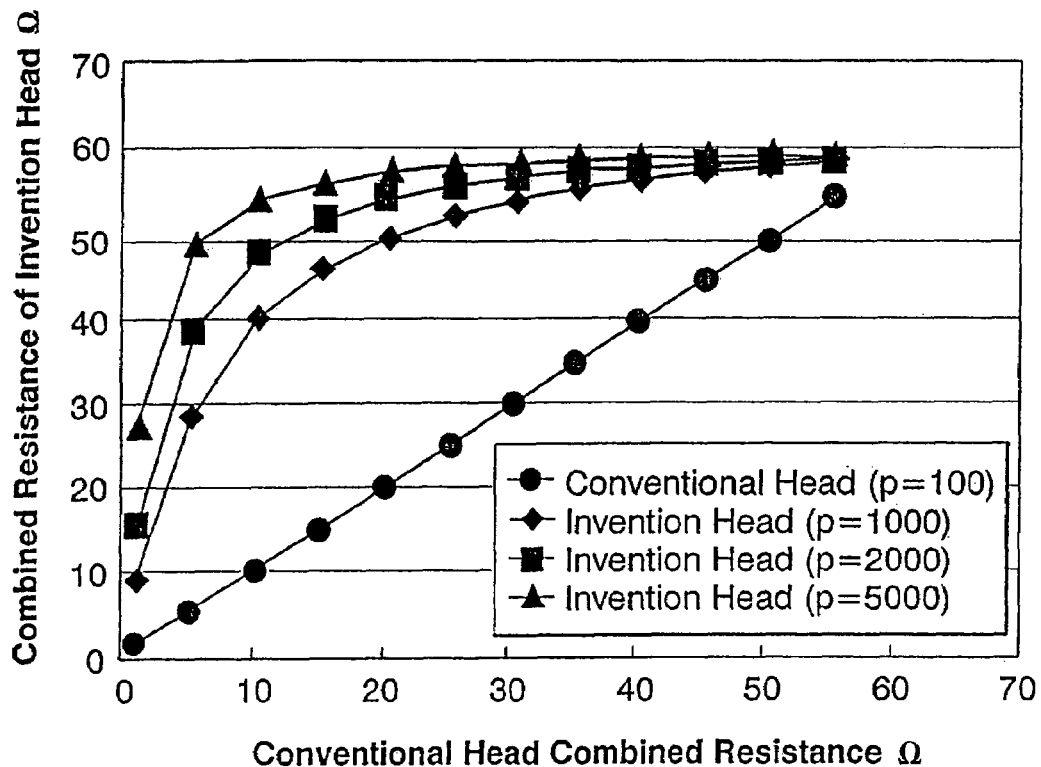
FIG. 3 is a graph that compares the combined resistance of conventional magnetic shield layers (the x-axis) with the combined resistance when the MR head of the presentation using magnetic shield layers formed from a granular alloys (the y-axis) having resistivity (rho) of 1000 microohm/cm, 2000 microohm/cm, 5000 microohm/cm.
Figure 4:
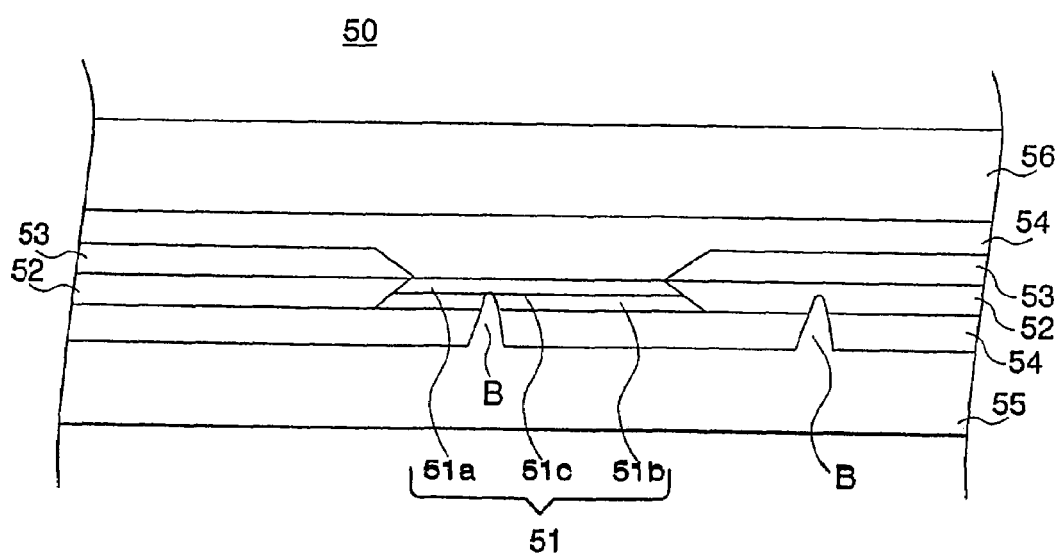
FIG. 4 is a drawing of a conventional MR head viewed facing the magnetic tape.

Specific examples of the present invention will be described in detail below, with references to the drawings. FIG. 1 is a drawing of a magnetoresistive magnetic head 1 (hereinafter referred to as the MR head 1) as seen from the surface facing the magnetic tape. The present invention is not restricted to the structure of the MR head 1 shown in FIG. 1, and it would also be possible to use the present invention for other types of MR heads equipped with magnetoresistive elements (MR elements) and magnetic sensors. For example, the present invention could be applied to a compound magnetic head in which an inductive magnetic recording head is integrated on top of the MR head shown in FIG. 1.

As shown in FIG. 1, the MR head 1 is formed with an MR element 11 at a central position. A longitudinal biasing layer 12 and an electrode layer 13 are disposed on either side of the MR element 11 and are separated by non-magnetic layers 14. This structure is interposed between a lower shield layer 15 and an upper shield layer 16.

An MR element 11 is located within a predetermined width (track width) along the plane facing the recording medium. The MR element 11 comprises a magnetoresistive effect film 11a (hereinafter referred to as the MR film 11a) formed from a soft magnetic material such as NiFe; a transverse biasing layer 11b which can apply a transverse biasing field to the MR film 11a and is formed from a soft magnetic material such as CoZrMo; a magnetic separator film 11c which is formed from a nonmagnetic metal film such as Ta to magnetically separate the MR film 11a, and the transverse biasing film 11b.

The MR film 11a exhibits magnetoresistive effects in which resistance changes in response to external magnetic fields. In the MR head 1, a magnetic field from the magnetic signal recorded on the magnetic tape is applied to the MR film 11a as an external magnetic field. The MR head 1 detects and plays back magnetic signals recorded on the magnetic tape by detecting voltage changes in the sensing current supplied to the MR film 11a by way of the electrode layer 13.

The longitudinal biasing layer 12 comprises a material having a high coercive force, such as CoCrPt, and can apply a longitudinal biasing field to the MR film 20. This longitudinal biasing layer 12 makes the MR film 11a of the MR head 1a single-domain and controls its magnetic characteristics. For example, domain walls are prevented from being generated around the MR film 11a, thus maintaining good output characteristics. The electrode layer 13 comprises a conductive material such as Au.

The lower shield layer 15 and the upper shield layer 16 comprise a material having high permeability and high resistivity. Preferably, these magnetic shield layers have a permeability of at least 300 and a resistivity of at least 1000 microohms/cm. A granular alloy may be used in the magnetic shield layer. The term "granular alloy" is a general term for materials in which ultrafine metal particles with diameters of around 10 nm are distributed at high densities in a ceramic matrix. The magnetic shield layers may be of the same or different materials. By selecting the magnetic particle size and the grain boundary material as described herein, ideal coercive force and high electrical resistivity can be achieved. Examples of materials for use as magnetic shield layers including but are not limited to, FeHfO, FeAlO, CoAlO, and the like.

These magnetic shield layers will not negatively affect the MR film 11a even if the friction generated by the surface of the MR head 1 sliding against the magnetic tape serving as the magnetic recording medium causes the lower shield layer 15 and the upper shield layer 16 to be moved or dragged in the direction of arrow A in FIG. 1.

A more specific description will be provided using FIG. 2 and FIG. 3. FIG. 2(a) shows an equivalent circuit (parallel circuit) of a short-circuit position B caused by sliding of the conventional MR element 51 of the MR head 50. FIG. 2(b) shows an equivalent circuit (parallel circuit) of a short-circuit position A caused by sliding of the MR head 11 of the MR head 1 according to the present invention. Based on the equivalent circuits shown in FIG. 2, FIG. 3 is a graph that shows the combined resistance of the predetermined resistance (60 ohm) of the MR element with magnetic shield layers having resistivity (rho) of 1000 microohm/cm, 2000 microohm/cm, and 5000 microohm/cm compared with the combined resistance when conventional magnetic shield layers are used. The combined resistance when the resistivity (rho) is 1000 microohm/cm, 2000 microohm/cm, and 5000 microohm/cm is closer to the predetermined resistance (60 ohm) of the MR element compared to the combined resistance for the conventional head.

The use of material having a high resistivity and high permeability, e.g., a granular alloy, for the magnetic shield layer in this embodiment effectively prevents short-circuits even if the magnetic shield layer is moved or dragged in the direction of arrow A in FIG. 1, since the resistance at the short-circuit position is very high.

The lower shield layer 15 and the upper shield layer 16 capture the magnetic signals on the magnetic tape that are not to be played back while they guide only the magnetic field to be played back to the MR element 11. In the MR head 1, the space between the magnetic shield layers is the playback gap length.

With the MR head 1 described above, the lower shield layer 15 and the upper shield layer 16 comprise a material with high permeability and high resistivity. As a result, even if there is friction between the magnetic tape and the surface of the head, the high permeability and high resistivity of the magnetic shield layers effectively prevents short-circuits between the magnetic shield layers and the magnetic element.

Since the magnetic head according to the present invention includes magnetic shield layers comprising a material having high permeability and high resistivity, even if there is sliding due to friction, there is effectively no short circuit between the magnetic shield layer and the magnetic element.

Preferably, the magnetic shield layers have a permeability of at least 300 and a resistivity of at least 1000 microohm/cm. A granular alloy can be selected for this magnetic shield layer. This provides good short-circuit prevention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic head comprising: a magnetoresistive element extending outwardly along a predetermined track width at a surface adapted to face a magnetic recording medium; said magnetoresistive element being interposed between a pair of magnetic shield layers which are separated by non magnetic layers; each said magnetic shield layer comprising the same or a different material having the same or different granular alloys; and each magnetic shield layer having a high permeability of at least 300 and a high resistivity of at least 1000 micro-ohm/cm.

* * * * *